US009410039B2

(12) United States Patent
Gane et al.

(10) Patent No.: US 9,410,039 B2
(45) Date of Patent: Aug. 9, 2016

(54) PROCESS FOR PREPARING SURFACE-REACTED CALCIUM CARBONATE AND ITS USE

(71) Applicants: Patrick A. C. Gane, Rothrist (CH); Daniel E. Gerard, Basel (CH); Joachim Schölkopf, Killwangen (CH)

(72) Inventors: Patrick A. C. Gane, Rothrist (CH); Daniel E. Gerard, Basel (CH); Joachim Schölkopf, Killwangen (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 13/961,406

(22) Filed: Aug. 7, 2013

(65) Prior Publication Data

US 2013/0323489 A1 Dec. 5, 2013

Related U.S. Application Data

(62) Division of application No. 13/378,147, filed as application No. PCT/IB2010/052667 on Jun. 15, 2010, now Pat. No. 8,785,687.

(60) Provisional application No. 61/269,242, filed on Jun. 22, 2009.

(30) Foreign Application Priority Data

Jun. 15, 2009 (EP) .................................... 09162738

(51) Int. Cl.
| | | |
|---|---|---|
| C01F 11/18 | (2006.01) |
| C07C 51/14 | (2006.01) |
| C09C 1/02 | (2006.01) |
| C09C 3/04 | (2006.01) |
| D21H 17/67 | (2006.01) |
| D21H 17/69 | (2006.01) |

(52) U.S. Cl.
CPC ............... *C09C 1/022* (2013.01); *C01F 11/185* (2013.01); *C09C 1/02* (2013.01); *C09C 1/021* (2013.01); *C09C 3/04* (2013.01); *D21H 17/67* (2013.01); *D21H 17/69* (2013.01); *C01P 2002/72* (2013.01); *C01P 2004/61* (2013.01); *C01P 2004/62* (2013.01); *C01P 2004/80* (2013.01); *C01P 2006/12* (2013.01); *D21H 17/675* (2013.01)

(58) Field of Classification Search
CPC ............. C01P 2002/72; C01P 2004/61; C01P 2004/62; C01P 2006/12; C01P 2004/80; C09C 1/02; C09C 1/021; C09C 3/04; C09C 1/022; D21H 17/67; D21H 17/675; D21H 17/69
See application file for complete search history.

(56) References Cited

U.S. PATENT DOCUMENTS

| | | | |
|---|---|---|---|
| 4,219,590 | A | 8/1980 | Shobazaki et al. |
| 5,403,017 | A | 4/1995 | Doss, III et al. |
| 5,584,923 | A | 12/1996 | Wu |
| 5,647,902 | A | 7/1997 | Wu |
| 5,711,799 | A | 1/1998 | Snowden et al. |
| 6,666,953 | B1 | 12/2003 | Gane et al. |
| 2006/0162884 | A1 | 7/2006 | Gane et al. |
| 2008/0022901 | A1 | 1/2008 | Buri et al. |

FOREIGN PATENT DOCUMENTS

| | | |
|---|---|---|
| EP | 1982759 A1 | 10/2008 |
| JP | 2007070164 | 3/2007 |
| WO | 9708247 A1 | 3/1997 |
| WO | 9820079 A1 | 5/1998 |
| WO | 9902608 A1 | 1/1999 |
| WO | 0039222 A1 | 6/2000 |
| WO | 2004031303 A1 | 4/2004 |
| WO | 2004083316 A1 | 9/2004 |

OTHER PUBLICATIONS

Office Action dated Aug. 22, 2013 for Chinese Application No. 201080034256.4.
The Written Opinion of the International Searching Authority for related PCT Application No. PCT/IB2010/052667, Aug. 11, 2010.

*Primary Examiner* — Nyeemah A Grazier
*Assistant Examiner* — Amanda L Aguirre
(74) *Attorney, Agent, or Firm* — Amster, Rothstein & Ebenstein LLP

(57) ABSTRACT

The present invention relates to an economic process for preparing surface-reacted calcium carbonate. The present invention further relates to a surface-reacted calcium carbonate having an increased specific BET surface area, and the use of a process for adjusting the specific BET surface area.

18 Claims, No Drawings

PROCESS FOR PREPARING SURFACE-REACTED CALCIUM CARBONATE AND ITS USE

CROSS-REFERENCE TO RELATED APPLICATIONS

This is a divisional of U.S. application Ser. No. 13/378,147, filed Jan. 9, 2012, which is a U.S. national phase of PCT Application No. PCT/IB2010/052667, filed Jun. 15, 2010, which claims priority to European Application No. 09162738.0, filed Jun. 15, 2009 and U.S. Provisional Application No. 61/269,242, filed Jun. 22, 2009, the contents of which are hereby incorporated by reference.

FIELD OF THE INVENTION

The present invention relates to an economic process for preparing surface-reacted calcium carbonate. The present invention further relates to a surface-reacted calcium carbonate having an increased BET surface area, and the use of a process for adjusting the BET surface area.

BACKGROUND OF THE INVENTION

In practice, calcium carbonate is used in huge quantities in the paper, paint, rubber and plastics industries for various purposes such as coatings, fillers, extenders and pigments for papermaking as well as aqueous lacquers and paints and in water treatment, and notably as a means of removing inorganic materials such as heavy metals and/or pharmaceutical waste such as polycyclic compounds, cholesterol and/or endocrine disrupting compounds (EDC).

With respect to precluding aggregation of calcium carbonate particles and enhancing the affinity of these particles with a substance to which the particles are being added, for example as a filler or flocculating agent, the physical and chemical properties of the surfaces of such calcium carbonate particles are amended by treating the calcium carbonate with fatty acid or a sodium salt of a fatty acid, resin acid or other acids.

In the art, several approaches for improving the chemical and physical properties of calcium carbonate have been proposed. For example, U.S. Pat. No. 4,219,590 describes a method for improving calcium carbonate by causing calcium carbonate particles to undergo contact reaction with an acid gas capable of reacting with calcium carbonate for finely uniformizing the calcium carbonate particle size and, at the same time, coating the surface of the calcium carbonate particles with the calcium salt of the acid of the acid gas. U.S. Pat. No. 6,666,953 B1 relates to a pigment, filler or mineral containing a natural calcium carbonate, treated with one of more providers of $H_3O^+$ ions and gaseous $CO_2$, allowing a reduction in the weight of paper for a constant surface area without loss of physical properties when it is used as a pigment or coating filler for said paper. WO 99/02608 A1 describes a method of producing a high solids slurry of an acid-resistant precipitated calcium carbonate, wherein a solids slurry is treated with a chemical additive, such as sodium aluminate, in order to impart acid resistance to the calcium carbonate.

Additionally, U.S. Pat. No. 5,584,923, U.S. Pat. No. 5,647,902, U.S. Pat. No. 5,711,799, WO 97/08247 A1 and WO 98/20079 A1, respectively, describe calcium carbonate which is acid-resistant to enable its use as a filler material in the making of neutral to weakly acidic paper, and a process for producing this acid-resistant calcium carbonate.

Furthermore, WO 2005/121257 A2 discloses a method for producing a dry mineral pigment characterized in that it contains a product formed in situ by the multiple reaction of a calcium carbonate and with the reaction product or products of said carbonate with gaseous $CO_2$ formed in situ and/or from an external supply; and with at least one compound of formula R—X. WO 2004/083316 A1 refers to mineral pigments containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminium hydroxide and/or at least one sodium and/or potassium aluminate, used in papermaking applications, such as mass filling and/or paper coating.

U.S. Pat. No. 5,043,017 relates to calcium carbonate, acid-stabilized by the addition to finely divided calcium carbonate of one of a calcium-chelating agent and a conjugate base, such as sodium hexametaphosphate, followed by the addition of an acid, such as phosphoric acid.

However, the prior art seems to be silent on economic methods for preparing and controlling high surface area materials and methods for controlling the particle size of materials allowing for the provision of specific calcium carbonate materials for the desired purpose. In particular, methods for preparing high surface area materials of the prior art require the use of high amounts and concentrations of medium-strong to strong acids (having a $pK_a$ of less than or equal to 2.5) to obtain a desired material having a high specific BET surface area. Additionally, the use of such medium-strong to strong acids necessitates the use of high safety requirements in order to minimize the danger to employees. Furthermore, the use of high amounts and concentrations of said medium-strong to strong acids also result in a high and cost-intensive consumption of chemicals and water.

Thus, it would be desirable to have a process available which allows for preparing surface-reacted calcium carbonate and provides the possibility of controlling particular parameters such as the specific BET surface area and particle size of the calcium carbonate.

SUMMARY OF THE INVENTION

Accordingly, it is an objective of the present invention to provide an economic process for preparing a surface-reacted calcium carbonate, in which the specific BET surface area of the calcium carbonate can be controlled or adjusted. A further objective of the present invention is the provision of a process for preparing calcium carbonate, in which the specific BET surface area of the calcium carbonate particles is increased. Another objective of the present invention is to provide a process, in which the required amount of medium-strong to strong acids is reduced for a given specific BET surface area of a calcium carbonate relative to a material prepared by a process of the prior art implementing only medium-strong to strong acids. Even a further objective of the present invention is to provide a process, in which the specific BET surface area of a calcium carbonate is increased for a given amount of medium-strong to strong acid relative to a material prepared by a process of the prior art implementing only medium-strong to strong acids. A further objective of the present invention is to provide a process, in which the particle size of the calcium carbonate particles can be controlled or adjusted. Another objective of the present invention is to provide a process, in which the surface-reacted calcium carbonate can be prepared in high yield.

The present invention aims at solving these and other objectives by providing a process for preparing surface-reacted calcium carbonate as described in the present invention and defined in the claims.

DETAILED DESCRIPTION OF THE INVENTION

According to one aspect of the present application a process for preparing a surface-reacted calcium carbonate in an aqueous environment has been developed, wherein the process comprises the following steps:

a) providing a calcium carbonate;
b) providing 5-50 wt.-%, based on the weight of calcium carbonate, of at least one acid having a $pK_a$ of less than or equal to 2.5, wherein the corresponding acid anion is capable of forming water-insoluble calcium salts;
c) providing gaseous $CO_2$;
d) providing at least one water soluble non-polymeric organic and/or inorganic weak acid and/or a hydrogen salt of said at least one water soluble non-polymeric organic and/or inorganic weak acid; and
e) contacting said calcium carbonate with said at least one acid having a $pK_a$ of less than or equal to 2.5 of step b), with said gaseous $CO_2$ of step c) and with said soluble non-polymeric organic and/or inorganic weak acid and/or hydrogen salt of said at least one water soluble non-polymeric organic and/or inorganic weak acid, of step d);

wherein the at least one water soluble non-polymeric organic and/or inorganic weak acid has a $pK_a$ of greater than 2.5 and wherein its corresponding acid anion is capable of forming water-insoluble calcium salts.

The inventors surprisingly found that control of particular parameters during the preparation process defined hereafter, and notably control of the moment of addition and quantity of a weak acid to the reaction system is key to the formation of a surface-reacted calcium carbonate having specific properties, e.g. an increased specific BET surface area and/or particle size relative to a process of the prior art implementing only medium-strong to strong acids.

For the purpose of the present application, "water-insoluble calcium salts" are defined as materials which, when mixed with deionised water and filtered through a filter having a pore size of 0.2 µm. at 20° C. to recover the liquid filtrate, provide less than or equal to 0.1 g of recovered solid material following evaporation at 95 to 100° C. of 100 g of said liquid filtrate. "Soluble (or solubilised) materials" are defined as materials leading to the recovery of greater than 0.1 g of recovered solid material following evaporation at 95 to 100° C. of 100 g of said liquid filtrate.

In accordance with the present invention, an "acid" is defined as a Bronsted-Lowry acid, that is to say, it is an $H_3O^+$-ion provider. An "acid anion" is defined as a deprotonated form of a Bronsted-Lowry acid, i.e. it is a conjugated base of an acid. An "acid salt" is defined as an $H_3O^+$-ion provider that is at least partially neutralised by a non-hydrogen electropositive element. A "salt" is defined as an electrically neutral ionic compound formed of anions and non-hydrogen cations. A "salt" may comprise the anhydrous form as well as forms comprising crystal water (hydrate). A "partially crystalline salt" is defined as a salt that, on XRD analysis, presents an essentially discrete diffraction diagram.

A "non-polymeric" organic and/or inorganic weak acid for the purpose of the present application is defined as an inorganic or organic compound having less than ten repeating structural units connected by covalent chemical bonds. A "hydrogen salt" of said at least one water soluble non-polymeric organic and/or inorganic weak acid is defined as an electrically neutral ionic compound formed of the acid anion of the at least one water soluble non-polymeric organic and/or inorganic weak acid and cations, wherein the salt contains at least one hydrogen atom.

A "slurry" in the meaning of the present invention is a suspension (comprising insoluble solids and water and optionally further additives) and usually contains large amounts of solids and is more viscous and generally of higher density than the liquid without solids from which it is formed.

In the meaning of the present invention, a "surface-reacted calcium carbonate" is a material comprising calcium carbonate and insoluble, preferably at least partially crystalline, calcium salts of anions of said acids of steps b) and d) above. In a preferred embodiment, the insoluble calcium salt extends from the surface of at least part of the calcium carbonate. The calcium ions forming said at least partially crystalline calcium salt of said anion originate largely from the starting calcium carbonate material.

A "specific BET surface area" (SSA) in the meaning of the present invention relates to the specific surface area measured via the method provided in the examples section hereafter.

In accordance with the present invention, the calcium carbonate comprises generally ground (or natural) calcium carbonate (GCC) and/or precipitated calcium carbonate (PCC), which is also known as synthetic calcium carbonate.

"Ground calcium carbonate" in the meaning of the present invention is a calcium carbonate obtained from natural sources, marble, chalk or limestone, and processed through a treatment such as grinding, screening and/or fractionizing by wet and/or dry, for example by a cyclone.

"Precipitated calcium carbonate" in the meaning of the present invention is a synthesized material, generally obtained by precipitation following reaction of carbon dioxide and lime in an aqueous environment or by precipitation of a calcium and carbonate source in water. Additionally, PCC can also be the product of introducing calcium and carbonate salts, calcium chloride and sodium carbonate for example, in an aqueous environment.

The present invention also refers to a surface-reacted calcium carbonate having a specific BET surface area (SSA), measured via the method provided in the examples section hereafter, of more than 50 $m^2/g$, more preferably of more than 60 $m^2/g$ and most preferably of more than 80 $m^2/g$.

Furthermore, the present invention refers to the use of the inventive process for controlling or adjusting properties and parameters of surface-reacted calcium carbonate, like the specific BET surface area.

According to one preferred embodiment of the inventive process, the at least one acid having a $pK_a$ of less than or equal to 2.5 is selected from the group consisting of strong acids having a $pK_a$ value of less than or equal to zero at 25° C., and medium-strong acids having a $pK_a$ value of between zero and 2.5, inclusive, at 25° C.

According to another preferred embodiment of the inventive process, the medium-strong acid is selected from the group consisting of $H_3PO_4$, oxalic acid and mixtures thereof.

According to yet another preferred embodiment of the inventive process, the at least one acid having a $pK_a$ of less than or equal to 2.5 is $H_3PO_4$, preferably $H_3PO_4$ in a concentration of 20% to 40% (v/v).

According to one preferred embodiment of the inventive process, the at least one water soluble non-polymeric organic and/or inorganic weak acid and/or hydrogen salt of said at least one water soluble non-polymeric organic and/or inorganic weak acid has a molecular weight of less than 1 000 g/mol, preferably less than 750 g/mol and more preferably less than 500 g/mol.

According to another preferred embodiment of the inventive process, said at least one water soluble non-polymeric organic and/or inorganic weak acid and/or hydrogen salt of said at least one water soluble non-polymeric organic and/or inorganic weak acid is selected from the group consisting of boric acid, citric acid, sodium dihydrogen citrate, potassium dihydrogen citrate, disodium hydrogen citrate, dipotassium hydrogen citrate, sodium dihydrogen borate, potassium dihydrogen borate, disodium hydrogen borate, dipotassium hydrogen borate and mixtures thereof.

According to yet another preferred embodiment of the inventive process, said at least one water soluble non-polymeric organic and/or inorganic weak acid and/or hydrogen salt of said at least one water soluble non-polymeric organic and/or inorganic weak acid is added in an amount in the range of 0.1 wt.-% and 20 wt.-%, preferably between 1 wt.-% and 15 wt.-%, more preferably between 1 wt.-% and 10 wt.-% and most preferably between 1 wt.-% and 5 wt.-%, based on the weight of calcium carbonate.

According to one preferred embodiment of the inventive process, the calcium carbonate is first contacted with the at least one water soluble non-polymeric organic and/or inorganic weak acid and/or hydrogen salt of said at least one water soluble non-polymeric organic and/or inorganic weak acid and then with the at least one acid having a $pK_a$ of less than or equal to 2.5.

According to another preferred embodiment of the inventive process, the calcium carbonate is simultaneously contacted with the at least one water soluble non-polymeric organic and/or inorganic weak acid and/or hydrogen salt of said at least one water soluble non-polymeric organic and/or inorganic weak acid and the at least one acid having a $pK_a$ of less than or equal to 2.5.

According to yet another preferred embodiment of the inventive process, the calcium carbonate is first contacted with the at least one acid having a $pK_a$ of less than or equal to 2.5 and during its addition, the calcium carbonate is also contacted with the at least one water soluble non-polymeric organic and/or inorganic weak acid and/or hydrogen salt of said at least one water soluble non-polymeric organic and/or inorganic weak acid.

According to one preferred embodiment of the inventive process, the calcium carbonate is first contacted with the at least one acid having a $pK_a$ of less than or equal to 2.5 and after 5% of the total amount of said at least one acid having a $pK_a$ of less than or equal to 2.5 have been added, the calcium carbonate is contacted with the at least one water soluble non-polymeric organic and/or inorganic weak acid and/or hydrogen salt of said at least one water soluble non-polymeric organic and/or inorganic weak acid.

According to another preferred embodiment of the inventive process, the calcium carbonate is first contacted with the at least one acid having a $pK_a$ of less than or equal to 2.5 and after 10% of the total amount of said at least one acid having a $pK_a$ of less or equal to than 2.5 have been added, the calcium carbonate is contacted with the at least one water soluble non-polymeric organic and/or inorganic weak acid and/or hydrogen salt of said at least one water soluble non-polymeric organic and/or inorganic weak acid.

According to yet another preferred embodiment of the inventive process, the calcium carbonate is first contacted with the at least one acid having a $pK_a$ of less than or equal to 2.5 and after 20% of the total amount of said at least one acid having a $pK_a$ of less than or equal to 2.5 have been added, the calcium carbonate is contacted with the at least one water soluble non-polymeric organic and/or inorganic weak acid and/or hydrogen salt of said at least one water soluble non-polymeric organic and/or inorganic weak acid.

According to one preferred embodiment of the inventive process, the calcium carbonate is first contacted with the at least one acid having a $pK_a$ of less than or equal to 2.5 and after 30% of the total amount of said at least one acid having a $pK_a$ of less than or equal to 2.5 have been added, the calcium carbonate is contacted with the at least one water soluble non-polymeric organic and/or inorganic weak acid and/or hydrogen salt of said at least one water soluble non-polymeric organic and/or inorganic weak acid.

According to another preferred embodiment of the inventive process, the calcium carbonate is first contacted with the at least one acid having a $pK_a$ of less or equal to than 2.5 and after 50% of the total amount of said at least one acid having a $pK_a$ of less than or equal to 2.5 have been added, the calcium carbonate is contacted with the at least one water soluble non-polymeric organic and/or inorganic weak acid and/or hydrogen salt of said at least one water soluble non-polymeric organic and/or inorganic weak acid.

According to yet another preferred embodiment of the inventive process, the calcium carbonate is first contacted with the at least one acid having a $pK_a$ of less or equal to than 2.5 and after 80% of the total amount of said at least one acid having a $pK_a$ of less than or equal to 2.5 have been added, the calcium carbonate is contacted with the at least one water soluble non-polymeric organic and/or inorganic weak acid and/or hydrogen salt of said at least one water soluble non-polymeric organic and/or inorganic weak acid.

According to another preferred embodiment of the inventive process, the at least one acid having a $pK_a$ of less than or equal to 2.5 is provided in the form of at least one $H_3O^+$-ion provider and 5 wt.-% to 50 wt.-%, based on the weight of calcium carbonate, of at least one acid anion, wherein the corresponding acid of the at least one acid anion has a $pK_a$ of less than or equal to 2.5 and said acid anion is capable of forming water-insoluble calcium salts.

According to one preferred embodiment of the inventive process, the calcium carbonate is further contacted with a compound selected from the group consisting of a sodium silicate, a potassium silicate, a lithium silicate, an aluminium silicate, a synthetic silica, a calcium silicate, an aluminium hydroxide, a sodium aluminate, a potassium aluminate and mixtures thereof.

According to another preferred embodiment of the inventive process, the surface reacted calcium carbonate obtained by the inventive process has a BET specific surface area, measured according to the measurement method provided in the examples section hereafter, of at least 20 m$^2$/g, preferably of at least 30 m$^2$/g, more preferably of at least 40 m$^2$/g, even more preferably of at least 50 m$^2$/g, still more preferably of at least 60 m$^2$/g, yet more preferably of at least 70 m$^2$/g and most preferably of at least 80 m$^2$/g.

According to one preferred embodiment of the present invention, the product obtained by the inventive process, i.e. the aqueous suspension is dried after step e) in order to preferably yield a dry or solid product.

In the following, the steps a) to e) of the inventive method for preparing surface-reacted calcium carbonate are described in more detail:

Step a): Providing Calcium Carbonate Comprising Aqueous Preparation

According to step a) of the process of the present invention, a calcium carbonate is provided.

Preferably, the calcium carbonate is selected from ground (or natural) calcium carbonate (GCC) and/or precipitated calcium carbonate (PCC), which is also known as synthetic calcium carbonate.

GCC is understood to be a naturally occurring form of calcium carbonate, mined from sedimentary rocks such as limestone or chalk, or from metamorphic marble rocks. GCC is almost exclusively of the calcitic polymorph, which is said to be trigonal-rhombohedral and represents the most stable of the calcium carbonate polymorphs.

Preferably, the natural calcium carbonate is selected from the group comprising marble, chalk, calcite, dolomite, limestone and mixtures thereof.

By contrast, calcium carbonate polymorphs of the PCC type often include, in addition to calcites, less stable polymorphs of the aragonitic-type, which has an orthorhombic, acicular crystal shape, and hexagonal vateritic-type, which has an even lower stability than aragonite. The different PCC forms may be identified according to their characteristic x-ray powder diffraction (XRD) peaks.

PCC synthesis most commonly occurs by a synthetic precipitation reaction that includes a step of contacting carbon dioxide with a solution of calcium hydroxide, the latter being most often provided on forming an aqueous suspension of calcium oxide, also known as burnt lime, and the suspension of which is commonly known as milk of lime. Depending on the reaction conditions, this PCC can appear in various forms, including both stable and unstable polymorphs. Indeed, PCC often represents a thermodynamically unstable calcium carbonate material.

When referred to in the context of the present invention, PCC shall be understood to mean synthetic calcium carbonate products obtained by carbonation of a slurry of calcium hydroxide, commonly referred to in the art as a slurry of lime or milk of lime when derived from finely divided calcium oxide particles in water.

Preferred synthetic calcium carbonate is precipitated calcium carbonate comprising aragonitic, vateritic or calcitic mineralogical crystal forms or mixtures thereof.

In a preferred embodiment, the calcium carbonate is ground prior to the process for preparing surface-reacted calcium carbonate. The grinding step can be carried out with any conventional grinding device such as a grinding mill known to the skilled person.

In a preferred embodiment, the calcium carbonate of step a) has a weight medium diameter of 0.01 μm to 10 μm, and more preferably of 0.5 μm to 2 μm, as measured according to the measurement method provided in the Examples section here below.

In a preferred process for the preparation of the aqueous suspension, the calcium carbonate, either finely divided (such as by grinding) or not, is suspended in water and thus in the form of a slurry.

In this preferred embodiment, said slurry preferably has a pH of less than 11, preferably of less than 10.5, as measured according to the measurement method described in the Examples section here below.

Preferably, the aqueous calcium carbonate slurry has a solids content greater than or equal to 10 wt.-%, and more preferably of between 10 wt.-% and 80 wt.-%, based on the weight of the slurry. The applicant would remark that in the case of very high solids contents, it is a requirement to have sufficient water for the reactions following the contacting of step e) to occur. More preferably, the aqueous calcium carbonate slurry has a solid content in the range of 16 wt.-% to 60 wt.-%, and even more preferably in the range of 16 wt.-% to 40 wt.-%, based on the weight of the slurry.

Step b): Providing at Least One Acid Having a $pK_a$ of Less than or Equal to 2.5

According to step b) of the process of the present invention, 5 wt.-% to 50 wt.-%, based on the weight of calcium carbonate, of at least one acid having a $pK_a$ of less than or equal to 2.5 is provided, wherein the corresponding acid anion is capable of forming water-insoluble calcium salts. Said insoluble corresponding calcium salts may, in addition to said acid anion, include OH– ions and/or crystal water.

The $H_3O^+$-ions provided by the at least one acid having a pKa of less than or equal to 2.5 serve to partially dissolve the calcium carbonate particle, generating calcium ions for subsequent precipitation of an insoluble, at least partially crystalline calcium salt of the anion at the calcium carbonate surface.

Preferably, the acid added to the aqueous suspension containing the calcium carbonate has a $pK_a$ at 25° C. of 2.5 or less. For medium-strong acids such as $H_3PO_4$, oxalic acid or mixtures thereof, a $pK_a$ at 25° C. from 0 to 2.5 may be observed. These one or more medium-strong to strong acids can be added to the suspension as a concentrated solution or diluted solution.

In one preferred embodiment of the present invention, $H_3PO_4$ is used as the at least one acid having a $pK_a$ of less than or equal to 2.5. It is especially preferred to use $H_3PO_4$ in a concentration of at least 10% (v/v), more preferably of at least 20% (v/v) and most preferably of at least 30% (v/v). In another preferred embodiment, it is preferred to use $H_3PO_4$ in a concentration of 20% to 40% (v/v).

In one preferred embodiment, the at least one acid having a $pK_a$ of less than or equal to 2.5 is provided in the form of:
(i) at least one $H_3O^+$-ion provider having a pKa of less than or equal to 2.5, wherein the corresponding acid anion is capable of forming a water-soluble calcium salt, and
(ii) at least one anion, provided in the form of a water-soluble salt or hydrogen salt, wherein the corresponding acid of this at least one anion has a $pK_a$ of less than or equal to 2.5 and wherein said anion is capable of forming water-insoluble calcium salts.

Said at least one $H_3O^+$-ion provider of (i) is preferably selected from the group consisting of nitric acid, sulphuric acid, hydrochloric acid, $H_2SO_3$, $HSO_4^-=$ or mixtures thereof.

In an especially preferred embodiment, said at least one anion of (ii) is added in a quantity corresponding to a quantity to between 5 wt.-% and 50 wt.-%, based on the weight of calcium carbonate.

In this case, said at least one $H_3O^+$-ion provider and the at least one anion are preferably provided separately, preferably such that the at least one $H_3O^+$-ion provider of step (i) is contacted with calcium carbonate before and/or during the contacting of calcium carbonate with the anion of (ii).

The cationic group of the water-soluble salt or hydrogen salt of (ii) is preferably selected from the group comprising lithium, sodium, potassium, rubidium and mixtures thereof. In one preferred embodiment, the salt of said at least one anion of (ii) is selected from the group comprising sodium sulphate ($Na_2SO_4$) sodium hydrogen sulphate ($NaHSO_4$), sodium sulphite ($Na_2SO_3$), sodium phosphate ($Na_3PO_4$), disodium hydrogen phosphate ($Na_2HPO_4$), sodium dihydrogen phosphate ($NaH_2PO_4$), disodium oxalate ($Na_2C_2O_4$), sodium hydrogen oxalate ($NaHC_2O_4$) and mixtures thereof. Preferably, the salt of the at least one acid anion is a sodium phosphate ($Na_{3-x}H_xPO_4$, where x=2, 1 or 0). Such salt in the meaning of the present invention shall be understood to comprise salts in the anhydrous form as well as forms comprising crystal water (hydrate).

The at least one anion in the form of a salt of (ii) can be added to the aqueous suspension comprising calcium carbonate in any appropriate solid form, e.g. in the form of granules or a powder. Alternatively or additionally, at least one anion in the form of a salt can be added to the aqueous suspension comprising calcium carbonate in the form of a concentrated solution or a more diluted solution.

In one preferred embodiment of the present invention, the at least one acid having a $pK_a$ of less than or equal to 2.5 is added continuously at essentially the same rate (amount/time) over a period of 2 h or less, preferably over a period of 1.5 h or less, more preferably over a period of 1 h or less and most preferably over a period of 30 min or less to the aqueous suspension comprising calcium carbonate. In an especially preferred embodiment the at least one acid having a $pK_a$ of less than or equal to 2.5 is added over a period of 15 min or less to the aqueous suspension comprising the calcium carbonate.

In another preferred embodiment the at least one acid having a $pK_a$ of less than or equal to 2.5 is added in one portion to the aqueous suspension comprising the calcium carbonate.

Said acid of step b) may be added in the form of a soluble neutral or acid salt, or in the form of an acid, provided it is solubilised before and/or during step e).

In a preferred embodiment, said at least one acid having a $pK_a$ of less than or equal to 2.5 is added in a quantity corresponding to between 5% and 50% by weight, preferably between 10% and 30% by weight, based on the weight of said calcium carbonate.

Following the addition of the at least one acid having a $pK_a$ of less than or equal to 2.5 to the slurry, the pH of the slurry, as measured according to the measurement method given in the Examples section here below, may drop temporarily to a value below 6.0.

Step c): Providing Gaseous $CO_2$

According to step c) of the process of the present invention, gaseous $CO_2$ is provided.

On contacting calcium carbonate with an acid having a $pK_a$ of less than or equal to 2.5, the required carbon dioxide may be formed in situ from the carbonate. Alternatively or additionally, the gaseous carbon dioxide can be supplied from an external source.

Acid treatment and treatment with gaseous carbon dioxide can be carried out simultaneously and automatically takes place when a strong acid is used. It is also possible to carry out an inventive acid treatment first, e.g. with a medium strong acid having a $pK_a$ in the range of 0 to 2.5 such as $H_2SO_3$, $HSO_4^-$, $H_3PO_4$, oxalic acid, followed by treatment with gaseous carbon dioxide supplied from an external source.

In the case where gaseous carbon dioxide is provided, the concentration of gaseous carbon dioxide in the aqueous suspension throughout step e) is, in terms of volume, such that the ratio (volume of suspension):(volume of gaseous $CO_2$) is from 1:0.05 to 1:20, even more preferably 1:0.05 to 1:5. In another preferred embodiment, said ratio of (volume of suspension):(volume of gaseous $CO_2$) is from 1:0.05 to 1:20, even more preferably 1:0.05 to 1:5 is maintained during the process of the present invention.

Step d): Providing at Least One Acid Having a $pK_a$ of Greater than 2.5

According to step d) of the process of the present invention, at least one water soluble non-polymeric organic and/or inorganic weak acid and/or hydrogen salt of said at least one water soluble non-polymeric organic and/or inorganic weak acid is provided, wherein said weak acid has a $pK_a$ of greater than 2.5 and wherein the corresponding acid anion is capable of forming water-insoluble calcium salts.

The at least one water soluble non-polymeric organic and/or inorganic weak acid added to the aqueous suspension comprising the calcium carbonate has a $pK_a$ at 25° C. of 2.5 or more. Preferably, said weak acid added to the aqueous suspension containing the calcium carbonate has a $pK_a$ at 25° C. of 3.0 or more. The one or more soluble non-polymeric organic and/or inorganic weak acids can be added to the aqueous suspension as a concentrated solution or a diluted solution.

In a preferred embodiment, the at least one water soluble non-polymeric organic and/or inorganic weak acid has a molecular weight of less than 1 000 g/mol, preferably less than 750 g/mol, more preferably less than 500 g/mol.

The at least one water soluble non-polymeric organic and/or inorganic weak acid added to the aqueous suspension is preferably selected from the group consisting of citric acid, boric acid, or mixtures thereof.

Alternatively or additionally, the at least one water soluble non-polymeric organic and/or inorganic weak acid may be added to the aqueous suspension in the form of a hydrogen salt. A "hydrogen salt" in the meaning of the present application is defined as an electrically neutral ionic compound formed of the acid anion of the at least one water soluble non-polymeric organic and/or inorganic weak acid and cations, wherein the salt contains at least one hydrogen atom. The cationic group of such salt is preferably selected from an alkali metal, preferably from lithium, sodium, potassium, rubidium and mixtures thereof.

In one preferred embodiment, the hydrogen salt of said at least one water soluble non-polymeric organic and/or inorganic weak acid is selected from the group consisting of sodium and/or potassium and/or lithium dihydrogen citrate, disodium and/or dipotassium and/or dilithium hydrogen citrate, sodium and/or potassium and/or lithium dihydrogen borate, disodium and/or dipotassium and/or dilithium borate and mixtures thereof. Preferably, the salt of said at least one water soluble non-polymeric organic and/or inorganic weak acid is disodium hydrogen citrate ($Na_2C_6H_6O_7$).

In a preferred embodiment, said at least one water soluble non-polymeric organic and/or inorganic weak acid and/or hydrogen salt of said at least one water soluble non-polymeric organic and/or inorganic weak acid is added in a quantity corresponding to between 0.1 wt.-% and 20 wt.-%, preferably between 1 wt.-% and 15 wt.-%, more preferably between 1.5 wt.-% and 10 wt.-% and most preferably between 2 wt.-% and 5 wt.-%, based on the weight of said calcium carbonate.

Preferably, the weight ratio of the at least one water soluble non-polymeric organic and/or inorganic weak acid and/or hydrogen salt of said at least one water soluble non-polymeric organic and/or inorganic weak acid to the at least one acid having a $pK_a$ of less than or equal to 2.5 in the suspension is from 1:100 to 100:1, more preferably 1:75 to 75:1, even more preferably 1:50 to 50:1, still more preferably 1:50 to 1:1, and most preferably 1:12 to 1:3.

Subsequent to the carbon dioxide treatment and the treatment with at least one acid having a $pK_a$ of less than or equal to 2.5 and at least one water soluble non-polymeric organic and/or inorganic weak acid and/or hydrogen salt of said at least one water soluble non-polymeric organic and/or inorganic weak acid, the pH of the aqueous suspension, measured at 20° C., usually may reach a value of greater than 6.0, preferably greater than 6.5, more preferably greater than 7.0, even more preferably greater than 7.5. In other words, a surface-reacted calcium carbonate as an aqueous suspension having a pH of greater than 6.0, preferably greater than 6.5, more preferably greater than 7.0, even more preferably greater than 7.5 is obtained. If the aqueous suspension is allowed to reach equilibrium, the pH usually is greater than 7. A pH of greater than 6.0 may be adjusted without the addition of a base when stirring of the aqueous suspension is continued for a sufficient time period, preferably 1 hour to 10 hours, more preferably 1 to 5 hours.

Alternatively, prior to reaching an equilibrium state, which occurs at a pH greater than 7, the pH of the aqueous suspension may be increased to a value greater than 6 by adding a base subsequent to carbon dioxide treatment. Any conventional base such as sodium hydroxide or potassium hydroxide can be used.

Step e): Treatment of the Calcium Carbonate

According to step e) of the process of the present invention, the calcium carbonate is contacted in an aqueous slurry environment with the acid having a $pK_a$ of less than or equal to 2.5 of step b) with said gaseous $CO_2$ of step c) and with said at least one water soluble non-polymeric organic and/or inorganic weak acid and/or hydrogen salt of said at least one water soluble non-polymeric organic and/or inorganic weak acid of step d).

Said calcium carbonate according to the inventive process is contacted or treated with at least one acid having a $pK_a$ of less than or equal to 2.5 (provided in step b)) and at least one water soluble non-polymeric organic and/or inorganic weak acid and/or hydrogen salt of said at least one water soluble non-polymeric organic and/or inorganic weak acid (provided in step d)) via the following routes:

Route IA: simultaneously contacting said calcium carbonate with the at least one acid having a $pK_a$ of less than or equal to 2.5 of step b) and with the at least one water soluble non-polymeric organic and/or inorganic weak acid and/or hydrogen salt of said at least one water soluble non-polymeric organic and/or inorganic weak acid of step d);

Route IIA: first contacting said calcium carbonate with the at least one water soluble non-polymeric organic and/or inorganic weak acid and/or hydrogen salt of said at least one water soluble non-polymeric organic and/or inorganic weak acid of step d) and then with the at least one acid having a $pK_a$ of less than or equal to 2.5 of step b);

Route IIIA: first contacting said calcium carbonate with the at least one acid having a $pK_a$ of less than or equal to 2.5 of step b) and, during its addition, the calcium carbonate is also contacted with the at least one water soluble non-polymeric organic and/or inorganic weak acid and/or hydrogen salt of said at least one water soluble non-polymeric organic and/or inorganic weak acid of step d).

In case where the at least one water soluble non-polymeric organic and/or inorganic weak acid and/or hydrogen salt of said at least one water soluble non-polymeric organic and/or inorganic weak acid and the at least one acid having a $pK_a$ of less than or equal to 2.5 are simultaneously added to the calcium carbonate (Route IA), the weak acid and/or its hydrogen salt can be blended or mixed with the at least one acid having a $pK_a$ of less than or equal to 2.5 prior to the addition.

The mixture of acids is then added to the aqueous suspension in one portion or continuously at essentially the same rate (amount/time) over a period of 2 h or less, preferably over a period of 1.5 h or less, more preferably over a period of 1 h or less and most preferably over a period of 30 min or less and in an especially preferred embodiment over a period of 15 min or less.

By using Route IA of the inventive process, it is possible to obtain carbonate particles having an increased specific BET surface area. Said process may provide calcium carbonate particles having a specific BET surface area that is at least 10% greater, more preferably at least 20% greater and most preferably at least 30% greater than the specific BET surface area obtained by contacting the same calcium carbonate provided in step a) either simultaneously or in distinct steps, with the at least one acid having a $pK_a$ of less than or equal to 2.5 and gaseous $CO_2$ but without adding the at least one water soluble non-polymeric organic and/or inorganic weak acid and/or hydrogen salt of said at least one water soluble non-polymeric organic and/or inorganic weak acid.

If the at least one water soluble non-polymeric organic and/or inorganic weak acid and/or hydrogen salt of said at least one water soluble non-polymeric organic and/or inorganic weak acid is added to the calcium carbonate suspension before contacting said calcium carbonate with the at least one acid having a $pK_a$ of less than or equal to 2.5 (Route IIA), the weak acid and/or its hydrogen salt may, for example, be added to the aqueous suspension in one portion or continuously at essentially the same rate (amount/time) over a period of 15 min or less, preferably over a period of 10 min or less, more preferably over a period of 5 min or less.

After the complete addition of the at least one water soluble non-polymeric organic and/or inorganic weak acid and/or hydrogen salt of said at least one water soluble non-polymeric organic and/or inorganic weak acid, the at least one acid having a $pK_a$ of less than or equal to 2.5 is added to the aqueous suspension in one portion or continuously at essentially the same rate (amount/time) over a period of 2 h or less, preferably over a period of 1.5 h or less, more preferably over a period of 1 h or less and most preferably over a period of 30 min or less and in an especially preferred embodiment over a period of 15 min or less.

By using Route IIA of the inventive process, it is possible to obtain calcium carbonate particles having a particular high weight median diameter. Said process may provide calcium carbonate particles having a median diameter that is at least 10% greater, more preferably at least 20% greater and most preferably at least 50% greater than the median diameter obtained by contacting the same calcium carbonate provided via Route IA; i.e. by treating said calcium carbonate simultaneously with a mixture of at least one acid having a $pK_a$ of less than or equal to 2.5 and at least one water soluble non-polymeric organic and/or inorganic weak acid and/or hydrogen salt of said at least one water soluble non-polymeric organic and/or inorganic weak acid.

All median diameters of surface-reacted calcium carbonate materials referred to in the present invention are measured according the measurement method provided in the examples section hereafter.

Furthermore, by using Route IIA of the inventive process, it is possible to obtain calcium carbonate particles having an increased specific BET surface area. Said process via Route IIA may provide calcium carbonate particles having a specific BET surface area that is at least 10% greater, more preferably at least 20% greater and even more preferably at least 50% greater than the specific BET surface area obtained by contacting the same calcium carbonate provided in step a) either simultaneously or in distinct steps, with the at least one acid having a $pK_a$ of less than or equal to 2.5 and gaseous $CO_2$ but without adding the at least one water soluble non-polymeric organic and/or inorganic weak acid and/or hydrogen salt of said at least one water soluble non-polymeric organic and/or inorganic weak acid.

If the at least one water soluble non-polymeric organic and/or inorganic weak acid and/or hydrogen salt of said at least one water soluble non-polymeric organic and/or inorganic weak acid is added to the aqueous suspension during contacting or treating said calcium carbonate with the at least one acid having a $pK_a$ of less than or equal to 2.5 (Route IIIA), the at least one acid having a $pK_a$ of less than or equal to 2.5 may, for example, be added to the aqueous suspension continuously at essentially the same rate (amount/time) over a period of 2 h or less, preferably over a period of 1.5 h or less, more preferably over a period of 1 h or less and most preferably over a period of 30 min or less and in an especially preferred embodiment over a period of 15 min or less.

During the addition of the at least one acid having a $pK_a$ of less than or equal to 2.5, preferably after 5%, after 10%, after 20%, after 30%, after 50% or after 80% of the time period required for continuously adding said acid(s) having a $pK_a$ of less than or equal to 2.5 to the calcium carbonate slurry, the calcium carbonate may be contacted with the at least one water soluble non-polymeric organic and/or inorganic weak acid and/or hydrogen salt of said at least one water soluble non-polymeric organic and/or inorganic weak acid. It is to be understood by the skilled person that, e.g., 5% of the time period necessary for continuously adding said acid(s) having a $pK_a$ of less than or equal to 2.5 essentially corresponds to the addition of 5% of the total amount of said acid(s) having a $pK_a$ of less than or equal to 2.5 to be added since the acid according to the present invention preferably is added at the same rate (amount/time).

Said weak acid and/or its hydrogen salt may for example be added to the aqueous suspension continuously at essentially the same rate (amount/time) over a period of 15 min or less, preferably over a period of 10 min or less, more preferably over a period of 5 min or less.

When using Route IIIA of the inventive process, the at least one water soluble non-polymeric organic and/or inorganic weak acid and/or hydrogen salt of said at least one water soluble non-polymeric organic and/or inorganic weak acid may be added near the beginning of the process of adding said acid(s) having a $pK_a$ of less than or equal to 2.5. For example, the at least one water soluble non-polymeric organic and/or inorganic weak acid and/or hydrogen salt of said at least one water soluble non-polymeric organic and/or inorganic weak acid may be added after 5% or after 10% of the time period necessary for continuously adding said acid(s) having a $pK_a$ of less than or equal to 2.5. By using route IIIA, it is possible to obtain calcium carbonate particles having an increased weight median diameter. Said process may provide calcium carbonate particles having a median diameter that is at least 5% greater, more preferably at least 10% greater and most preferably at least 20% greater than the median diameter obtained by contacting the same calcium carbonate provided in step a) with gaseous carbon dioxide and the at least one water soluble non-polymeric organic and/or inorganic weak acid and/or hydrogen salt of said at least one water soluble non-polymeric organic and/or inorganic weak acid at the end of the process of adding said acid(s) having a $pK_a$ of less than or equal to 2.5, i.e. for example after 80% of the time period necessary for continuously adding said acid(s) having a $pK_a$ of less than or equal to 2.5.

Accordingly, it is possible to obtain calcium carbonate particles having a decreased median diameter by using Route IIIA of the inventive process, if the at least one water soluble non-polymeric organic and/or inorganic weak acid and/or hydrogen salt of said at least one water soluble non-polymeric organic and/or inorganic weak acid is added near the end of the process of adding said acid(s) having a $pK_a$ of less than or equal to 2.5, for example after 80% of the time period necessary for continuously adding said acid(s) having a $pK_a$ of less than or equal to 2.5 (and essentially corresponding to 80% of the total amount of said acid(s) having a $pK_a$ of less than or equal to 2.5 to be added).

Furthermore, by using Route IIIA of the inventive process, it is also possible to obtain calcium carbonate particles having an increased specific BET surface area. The process may provide calcium carbonate particles having a specific BET surface area that is at least 10% greater, more preferably at least 15% greater and even more preferably at least 20% greater than the specific BET surface area obtained by contacting the same calcium carbonate provided in step a) with the at least one water soluble non-polymeric organic and/or inorganic weak acid and/or hydrogen salt of said at least one water soluble non-polymeric organic and/or inorganic weak acid near the end of the process of adding said acid(s) having a $pK_a$ of less than or equal to 2.5, i.e., for example, after 80% of the time period necessary for continuously adding said acid(s) having a $pK_a$ of less than or equal to 2.5.

Accordingly, it is possible to selectively control or adjust specific parameters or properties of the calcium carbonate like the specific BET surface area and the median diameter by using Route IIIA of the inventive process. The addition of the at least one water soluble non-polymeric organic and/or inorganic weak acid and/or hydrogen salt of said at least one water soluble non-polymeric organic and/or inorganic weak acid at the end of the process of adding said acid(s) having a $pK_a$ of less than or equal to 2.5 to the calcium carbonate dispersion may lead to calcium carbonate particles having a decreased or lower specific BET surface area and a lower weight median diameter, whereas the addition of the at least one water soluble non-polymeric organic and/or inorganic weak acid and/or hydrogen salt of said at least one water soluble non-polymeric organic and/or inorganic weak acid at the beginning of the process of acid(s) having a $pK_a$ of less than or equal to 2.5 addition, e.g. after 5 wt.-% of the acid(s) having a $pK_a$ of less than or equal to 2.5 have been added, may lead to calcium carbonate particles having an increased specific BET surface area and a higher or increased weight median diameter.

In a preferred embodiment, step e) is carried out at temperatures of above room temperature, more preferably of above 50° C., and even more preferably of above 60° C.

In a preferred embodiment, the slurry is mixed so as to develop an essentially laminar flow.

In an optional embodiment, step e) takes place in the presence of at least one compound selected from the group consisting of a silicate of a monovalent salt such as a sodium silicate, a potassium silicate, a lithium silicate, an aluminium silicate, a synthetic silica, a calcium silicate, an aluminium hydroxide, a sodium aluminate, a potassium aluminate and mixtures thereof. Preferably the monovalent salt is sodium silicate.

According to a further embodiment of the present invention, step e) takes place in the presence of an inert gas, which is bubbled through the slurry.

The acid treatment steps and/or the carbon dioxide treatment step may be repeated once or several times, if appropriate.

In a preferred embodiment of the present invention, the obtained slurry comprising the surface-reacted calcium carbonate has a solid content, as measured according to the measurement method described in the Examples section hereafter, of up to 25% by weight, preferably between 5% and 20% by weight.

In a preferred embodiment, the aqueous phase of the obtained surface-reacted calcium carbonate slurry may be replaced with deionised water. In a more preferred embodiment, the aqueous phase of said surface-reacted calcium carbonate slurry is collected and recirculated into the process according to the present invention as a means to provide all or part of the solubilised calcium ions. This is particularly of interest when the process according to the invention is a continuous process.

The obtained surface-reacted calcium carbonate slurry may be concentrated, optionally up to the point of obtaining a dry surface-reacted calcium carbonate product. If the aqueous suspension described above is dried, the obtained solid (i.e. dry or containing as little water that it is not in a fluid form) surface-reacted calcium carbonate may be in the form of granules or a powder. In the case of a dry product, this product may additionally be treated with fatty acids. In the case of a dry product, this product may be additionally washed with water.

Thus, a slurry of surface-reacted calcium carbonate is obtained, wherein said surface-reacted calcium carbonate comprises an insoluble, at least partially crystalline calcium salt of an anion derived from the at least one acid having a $pK_a$ of less than or equal to 2.5 and/or the at least one water soluble non-polymeric organic and/or inorganic weak acid and/or hydrogen salt of said at least one water soluble non-polymeric organic and/or inorganic weak acid, which preferably extends from the surface of at least part of the calcium carbonate, provided in step a).

This surface-reacted calcium carbonate provides a specific BET surface area that is at least 5% greater than the BET specific surface area obtained following contacting the same calcium carbonate provided in step a), either simultaneously or in distinct steps, with the at least one acid having a $pK_a$ of less than or equal to 2.5 and gaseous $CO_2$ but without adding the at least one water soluble non-polymeric organic and/or inorganic weak acid and/or hydrogen salt of said at least one water soluble non-polymeric organic and/or inorganic weak acid.

In a preferred embodiment the resulting surface-reacted calcium carbonate has a specific BET surface area that is at least 10% greater, more preferably at least 20% greater and most preferably at least 50% greater than the specific BET surface area of a calcium carbonate obtained by contacting the same calcium carbonate either simultaneously or in distinct steps, with the at least one acid having a $pK_a$ of less than or equal to 2.5 and gaseous $CO_2$ but without adding the at least one water soluble non-polymeric organic and/or inorganic weak acid and/or hydrogen salt of said at least one water soluble non-polymeric organic and/or inorganic weak acid.

The surface-reacted calcium carbonate obtained by the inventive process may further provide a specific BET surface area that is the same as the specific BET surface area obtained by contacting the same calcium carbonate either simultaneously or in distinct steps, with the at least one acid having a $pK_a$ of less than or equal to 2.5 and gaseous $CO_2$ but without adding the at least one water soluble non-polymeric organic and/or inorganic weak acid and/or hydrogen salt of said at least one water soluble non-polymeric organic and/or inorganic weak acid. In this case, the required amount of the at least one acid having a $pK_a$ of less or equal to than 2.5 is reduced of at least 5 wt.-%, more preferably of at least 10 wt.-%, even more preferably of at least 15 wt-% and most preferably of at least 20 wt.-%, based on the weight of said at least one acid having a $pK_a$ of less than or equal to 2.5.

In a preferred embodiment, the surface-reacted calcium carbonate obtained by the inventive process has a specific surface area of more than 20 $m^2/g$, e.g. 20 $m^2/g$ to 200 $m^2/g$, preferably more than 30 $m^2/g$, e.g. 30 $m^2/g$ to 150 $m^2/g$, more preferably more than 40 $m^2/g$, even more preferably more than 50 $m^2/g$, still more preferably more than 60 $m^2/g$, yet more preferably more than 70 $m^2/g$ and most preferably more than 80 $m^2/g$, measured using nitrogen and the BET method according to the method provided in the examples section hereafter.

Furthermore, it is preferred that the surface-reacted natural or synthetic calcium carbonate has a weight median grain diameter of from 0.1 µm to 50 µm, preferably of from 1 µm to 25 µm, more preferably of from 3 µm to 15 µm, and most preferably of from 5 µm to 12 µm as measured according to the measurement method provided in the examples section hereafter.

In a preferred embodiment, the surface-reacted calcium carbonate has a specific BET surface area within the range of 20 $m^2/g$ to 150 $m^2/g$ or 30 $m^2/g$ to 200 $m^2/g$ and a weight median grain diameter within the range of 0.1 µm to 50 µm.

The inventive surface-reacted calcium carbonate or a slurry of said surface-reacted calcium carbonate may be used (in the form of slurries or in the form of dry products) in paper, tissue paper, plastics, paints, or as a controlled release or water treatment agent.

The surface-reacted calcium carbonate obtained by the process of the present invention is preferably brought into contact with water to be purified, e.g. industrial waste water, drinking water, urban waste water, waste water from breweries, or water in the paper industry, by any conventional means known to the skilled person.

The surface-reacted calcium carbonate can be added as an aqueous suspension, e.g. the suspension described above. Alternatively, it can be added to the water to be purified in any appropriate solid form, e.g. in the form of granules or a powder or in the form of a cake.

The water may contain organic impurities, e.g. resulting from human waste, organic materials, soil, surfactants as well as inorganic impurities, in particular heavy metal impurities such as iron- or manganese-containing compounds. Harmful components that can be removed from the water with the purification process of the present invention also include microorganisms such as bacteria, fungi, archaea, or protists.

The following examples are meant to illustrate the invention without restricting its scope:

EXAMPLES

Measurement Methods

The following measurement methods are used to evaluate the parameters given in the examples and claims.

Specific Surface Area (SSA) of a Material

The specific surface area is measured via the BET method according to ISO 9277 using nitrogen, following conditioning of the sample by heating at 250° C. for a period of 30 minutes. Prior to such measurements, the sample is filtered within a Büchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

Particle Size Distribution (Mass % Particles with a Diameter <X) and Weight Median Grain Diameter ($d_{50}$) of Non-Surface Reacted Calcium Carbonate Particulate Material (i.e. Calcium Carbonate Starting Material)

Weight median grain diameter and grain diameter mass distribution of a particulate material, such as calcium carbonate, are determined via the sedimentation method, i.e. an analysis of sedimentation behaviour in a gravimetric field. The measurement is made with a Sedigraph™ 5120.

The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and ultrasonic.

Median Grain Diameter ($d_{50}$) of Surface-Reacted Calcium Carbonate Material

Median grain diameter of surface-reacted calcium carbonate material is determined using a Malvern Mastersizer 2000 Laser Diffraction System.

X-Ray Diffraction (XRD)

Crystallographic structures of materials were identified based on the XRD analytical technique using Brucker AXS: D8 Advance instrumentation, scanning 2 to 70° 2theta at a scanning speed of 0.5 seconds/step and a step size of 0.01° 2theta. Analysis of the resulting spectra was based on the PDF 2 database of reference spectra issued by the International Centre for Diffraction Data.

pH of an Aqueous Slurry

The pH of the aqueous suspension is measured using a standard pH-meter at approximately 25° C.

Solids Content of an Aqueous Slurry

The slurry solids content (also known as "dry weight") is determined using a Moisture Analyser HR73 commercialised by Mettler-Toledo with the following settings: temperature of 120° C., automatic switch off 3, standard drying, 5-20 g of slurry.

Example 1

The following illustrative Example of the invention involves contacting a calcium carbonate according to the process of the present invention in comparison to contacting the same calcium carbonate with the at least one acid having a $pK_a$ of less than or equal to 2.5 and gaseous $CO_2$ but without adding the at least one water soluble non-polymeric organic and/or inorganic weak acid and/or hydrogen salt of said at least one water soluble non-polymeric organic and/or inorganic weak acid and contacting the same calcium carbonate with the at least one water soluble non-polymeric organic and/or inorganic weak acid and/or hydrogen salt of said at least one water soluble non-polymeric organic and/or inorganic weak acid and gaseous $CO_2$ but without adding the at least one acid having a $pK_a$ of less than or equal to 2.5.

1. Preparation of Calcium Carbonate Slurries a. Calcium Carbonate Slurry V1 (Prior Art)

A calcium carbonate slurry V1 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1\times10^{-3}$ moles $H_3PO_4$ per gram calcium carbonate is added via a peristaltic pump to the calcium carbonate slurry over a period of 15 minutes. Following this addition, the slurry is stirred for an additional 5 minutes by using a propeller type mixer.

The resulting slurry is allowed to sit overnight before filtering and drying the obtained product. The final specific BET surface area of this dry product is measured.

b. Calcium Carbonate Slurry V2

A calcium carbonate slurry V2 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, citric acid in an amount corresponding to 5% by weight on calcium carbonate weight is added via a peristaltic pump to the calcium carbonate slurry. After finishing the addition of citric acid, $H_3PO_4$ in an amount corresponding to 10% by weight on calcium carbonate weight and to approximately $1\times10^{-3}$ moles $H_3PO_4$ per gram calcium carbonate is added via a peristaltic pump to the calcium carbonate slurry over a period of 15 minutes. Following this addition, the slurry is stirred for an additional 5 minutes by using a propeller type mixer.

The resulting slurry is allowed to sit overnight before filtering and drying the obtained product. The final specific BET surface area of this dry product is measured.

c. Calcium Carbonate Slurry V3

A calcium carbonate slurry V3 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, citric acid in an amount corresponding to 5% by weight on calcium carbonate weight is added via a peristaltic pump to the calcium carbonate slurry. Following this addition, the slurry is stirred for an additional 5 minutes by using a propeller type mixer.

The resulting slurry is allowed to sit overnight before filtering and drying the obtained product. The final specific BET surface area of this dry product is measured.

The following Table 1 shows the prepared calcium carbonate slurries and the corresponding specific BET surface areas and short-term absorption rates:

| Sample | V1 | V2 | V3 |
| --- | --- | --- | --- |
| % $H_3PO_4$ | 10 | 10 | none |
| % citric acid | none | 5 | 5 |
| SSA of product/m²/g | 24.0 | 46.0 | 7.0 |

Example 2

The following illustrative Example of the invention involves contacting a calcium carbonate according to the process of the present invention, wherein the concentration of the at least one acid having a $pK_a$ of less than or equal to 2.5 is varied.

1. Preparation of Calcium Carbonate Slurries a. Calcium Carbonate Slurry V4

A calcium carbonate slurry V4 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 30% by weight on calcium carbonate weight and to approximately $3\times10^{-3}$ moles $H_3PO_4$ per gram calcium carbonate is added via a peristaltic pump to the calcium carbonate slurry over a period of 15 minutes. After 15% of elapsed time for addition of $H_3PO_4$ (2 min), citric acid in an amount corresponding to 5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

b. Calcium Carbonate Slurry V5

A calcium carbonate slurry V5 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 20% by weight on calcium carbonate weight and to approximately $2 \times 10^{-3}$ moles $H_3PO_4$ per gram calcium carbonate is added via a peristaltic pump to the calcium carbonate slurry over a period of 15 minutes. After 15% of elapsed time for addition of $H_3PO_4$ (2 min), citric acid in an amount corresponding to 5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

c. Calcium Carbonate Slurry V6

A calcium carbonate slurry V6 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 15% of elapsed time for addition of $H_3PO_4$ (2 min), citric acid in an amount corresponding to 5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

The following Table 2 shows the prepared calcium carbonate slurries and the corresponding specific BET surface areas:

| Sample | V4 | V5 | V6 |
|---|---|---|---|
| % $H_3PO_4$ | 30 | 20 | 10 |
| % citric acid | 5 | 5 | 5 |
| SSA of product/m²/g | 108.5 | 84.9 | 48.3 |

Example 3

The following illustrative Example of the invention involves contacting a calcium carbonate according to the process of the present invention, wherein the concentration of the at least one water soluble non-polymeric organic and/or inorganic weak acid and/or hydrogen salt of said at least one water soluble non-polymeric organic and/or inorganic weak acid is varied.

1. Preparation of Calcium Carbonate Slurry a. Calcium Carbonate Slurry V7

A calcium carbonate slurry V7 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 50% of elapsed time for addition of $H_3PO_4$ (7.5 min), citric acid in an amount corresponding to 1% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

b. Calcium Carbonate Slurry V8

A calcium carbonate slurry V8 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 50% of elapsed time for addition of $H_3PO_4$ (7.5 min), citric acid in an amount corresponding to 2.5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

The following Table 3 shows the prepared calcium carbonate slurries and the corresponding specific BET surface areas:

| Sample | V1 | V7 | V8 |
|---|---|---|---|
| % $H_3PO_4$ | 10 | 10 | 30 |
| % citric acid | none | 1 | 2.5 |
| Time of addition of citric acid relative to the total time of $H_3PO_4$ addition | — | 50% | 50% |
| SSA of product/m²/g | 24 | 34.5 | 38.4 |

Example 4

The following illustrative Example of the invention involves contacting a calcium carbonate according to the process of the present invention, wherein the calcium carbonate is contacted with 30% of the at least one acid having a p$K_a$ of less than or equal to 2.5 and the time point of adding the at least one water soluble non-polymeric organic and/or inorganic weak acid and/or hydrogen salt of said at least one water soluble non-polymeric organic and/or inorganic weak acid is varied.

1. Preparation of Calcium Carbonate Slurries a. Calcium Carbonate Slurry V9

A calcium carbonate slurry V9 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, citric acid in an amount corresponding to 5% by weight on calcium carbonate weight is added via a peristaltic pump to the calcium carbonate slurry. After the complete addition of citric acid, $H_3PO_4$ in an amount corresponding to 30% by weight on calcium carbonate weight and to approximately $3 \times 10^{-3}$ moles $H_3PO_4$ per gram calcium carbonate is added via a peristaltic pump to the calcium carbonate slurry over a period of 15 minutes. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

The following Table 4 shows the prepared calcium carbonate slurries and the corresponding specific BET surface areas:

| Sample | V4 | V9 |
|---|---|---|
| % $H_3PO_4$ | 30 | 30 |
| % citric acid | 5 | 5 |
| Time of addition of citric acid relative to the total time of $H_3PO_4$ addition | 15% | Pre-Addition |
| SSA of product/m²/g | 108.5 | 105.5 |
| $d_{50}$/μm | 8.20 | 11.94 |

Example 5

The following illustrative Example of the invention involves contacting a calcium carbonate according to the process of the present invention, wherein the calcium carbonate is contacted with 10% of the at least one acid having a p$K_a$ of less than or equal to 2.5 and the time point of adding the at least one water soluble non-polymeric organic and/or inorganic weak acid and/or hydrogen salt of said at least one water soluble non-polymeric organic and/or inorganic weak acid is varied.

1. Preparation of Calcium Carbonate Slurries a. Calcium Carbonate Slurry V10

A calcium carbonate slurry V10 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate blended with citric acid in an amount corresponding to 5% by weight on calcium carbonate weight is added via a peristaltic pump to the calcium carbonate slurry over a period of 15 minutes. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

b. Calcium Carbonate Slurry V11

A calcium carbonate slurry V11 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 15% of elapsed time for addition of $H_3PO_4$ (2 min), citric acid in an amount corresponding to 5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

The following Table 5 shows the prepared calcium carbonate slurries and the corresponding specific BET surface areas:

| Sample | V2 | V10 | V11 |
|---|---|---|---|
| % $H_3PO_4$ | 10 | 10 | 10 |
| % citric acid | 5 | 5 | 5 |
| Time of addition of citric acid relative to the total time of $H_3PO_4$ addition | Pre-Addition | simultaneously | t = 15% |
| SSA of product/m²/g | 46 | 50.1 | 48.3 |
| $d_{50}$/μm | 9.43 | 6.27 | 5.16 |

Example 6

The following illustrative Example of the invention involves contacting a calcium carbonate according to the process of the present invention, wherein the calcium carbonate is contacted with 10% of the at least one acid having a p$K_a$ of less than or equal to 2.5 and the time point of adding the at least one water soluble non-polymeric organic and/or inorganic weak acid is varied.

1. Preparation of Calcium Carbonate Slurries a. Calcium carbonate slurry V12

A calcium carbonate slurry V12 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 50% of elapsed time for addition of $H_3PO_4$ (7.5 min), citric acid in an amount corresponding to 2.5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

b. Calcium Carbonate Slurry V13

A calcium carbonate slurry V13 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 80% of elapsed time for addition of $H_3PO_4$ (12 min), citric acid in an amount corresponding to 2.5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

The following Table 6 shows the prepared calcium carbonate slurries and the corresponding specific BET surface areas:

| Sample | V12 | V13 |
|---|---|---|
| % $H_3PO_4$ | 10 | 10 |
| % citric acid | 2.5 | 2.5 |
| time of addition of citric acid relative to the total time of $H_3PO_4$ addition | 50% | 80% |
| SSA of product/m²/g | 38.4 | 38.9 |
| $d_{50}$/μm | 7.6 | 5.9 |

Example 7

The following illustrative Example of the invention involves contacting a calcium carbonate according to the process of the present invention, wherein the calcium carbonate is contacted with 10% of the at least one acid having a $pK_a$ of less than or equal to 2.5 and the time point of adding the at least one water soluble non-polymeric organic and/or inorganic weak acid and/or hydrogen salt of said at least one water soluble non-polymeric organic and/or inorganic weak acid is varied.

1. Preparation of Calcium Carbonate Slurries a. Calcium Carbonate Slurry V14

A calcium carbonate slurry V14 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 80% of elapsed time for addition of $H_3PO_4$ (12 min), citric acid in an amount corresponding to 2.5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

b. Calcium Carbonate Slurry V15

A calcium carbonate slurry V15 is prepared by adding water and 250 g of chalk in a 5 L stainless steel reactor, such that the aqueous slurry obtained has a solids content of 10% by dry weight. The temperature of this slurry is thereafter brought to and maintained at 70° C. by using of a Julabo hot-oil thermostat.

Under stirring such that an essentially laminar flow is established, $H_3PO_4$ in an amount corresponding to 10% by weight on calcium carbonate weight and to approximately $1 \times 10^{-3}$ moles $H_3PO_4$ per gram calcium carbonate is added via a peristaltic pump to the calcium carbonate slurry over a period of 15 minutes. After 15% of elapsed time for addition of $H_3PO_4$ (2 min), citric acid in an amount corresponding to 5% by weight on calcium carbonate weight is added via a peristaltic pump to the calcium carbonate slurry. Following the complete addition of acids, the slurry is stirred for an additional 5 minutes by using a propeller type mixer.

The resulting slurry is allowed to sit overnight before filtering and drying the obtained product. The final specific BET surface area of this dry product is measured.

The following Table 7 shows the prepared calcium carbonate slurries and the corresponding specific BET surface areas:

| Sample | V14 | V15 |
|---|---|---|
| % $H_3PO_4$ | 10 | 10 |
| % citric acid | 5 | 5 |
| time of addition of citric acid relative to the total time of $H_3PO_4$ addition | 80% | 15% |
| SSA of product/m²/g | 38.9 | 48.3 |
| $d_{50}$/μm | 5.9 | 5.16 |

The invention claimed is:

1. A composition obtained by the process comprising the following steps:
   a) providing a calcium carbonate;
   b) providing 5 wt.-% to 50 wt.-%, based on the weight of calcium carbonate, of at least one acid having a $pK_a$ of less than or equal to 2.5, wherein the corresponding acid anion is capable of forming water-insoluble calcium salts;
   c) providing 1 wt.-% to 20 wt.-%, based on the weight of calcium carbonate, of at least one agent selected from the group consisting of boric acid, citric acid, sodium dihydrogen citrate, potassium dihydrogen citrate, disodium hydrogen citrate, dipotassium hydrogen citrate, sodium dihydrogen borate, potassium dihydrogen borate, disodium hydrogen borate, dipotassium hydrogen borate, and any mixture thereof; and d) contacting the calcium carbonate of step a) with (i) the at least one acid having a p$K_a$ of less than or equal to 2.5 of step b), and (ii) the at least agent of step c), in an aqueous environment, in the presence of gaseous $CO_2$, which is formed in situ or provided from an external source, to obtain a composition comprising surface-reacted calcium carbonate having a BET specific surface area of at least 30 $m^2/g$; and e) optionally drying the surface-reacted calcium carbonate obtained in step d).

2. The composition according to claim 1, wherein the at least one acid having a p$K_a$ of less than or equal to 2.5 is selected from the group consisting of strong acids having a p$K_a$ value of less than or equal to zero at 25° C., and medium-strong acids having a p$K_a$ value of between zero and 2.5 at 25° C.

3. The composition according to claim 1, wherein the at least one acid having a p$K_a$ of less than or equal to 2.5 is $H_3PO_4$, oxalic acid or a mixture thereof.

4. The composition according to claim 1, wherein the at least one acid having a p$K_a$ of less than or equal to 2.5 is $H_3PO_4$.

5. The composition according to claim 1, wherein the at least one acid having a p$K_a$ of less than or equal to 2.5 is $H_3PO_4$ in a concentration of 20% to 40% (v/v).

6. The composition according to claim 1, wherein the at least one agent of step c) is citric acid.

7. The composition according to claim 1, wherein the at least one acid having a p$K_a$ of less than or equal to 2.5 is $H_3PO_4$ in a concentration of 20% to 40% (v/v), and the at least agent of step c) is citric acid.

8. The composition according to claim 1, wherein the at least one agent of step c) is provided in an amount between 1 wt.-% and 15 wt.-%, based on the weight of calcium carbonate.

9. The composition according to claim 1, wherein the at least one agent of step c) is provided in an amount between 1.5 wt.-% and 10 wt.-%, based on the weight of calcium carbonate.

10. The composition according to claim 1, wherein the at least one agent of step c) is provided in an amount between 2 wt.-% and 5 wt.-%, based on the weight of calcium carbonate.

11. The composition according to claim 1, wherein the at least one acid having a p$K_a$ of less than or equal to 2.5 is provided in step b) in the form of:
   (i) at least one $H_3O^+$-ion provider having a pKa of less than or equal to 2.5, wherein the corresponding acid anion is capable of forming a water-soluble calcium salt, and
   (ii) at least one anion, provided in the form of a water-soluble salt or hydrogen salt, wherein the corresponding acid of this at least one anion has a p$K_a$ of less than or equal to 2.5 and wherein the anion is capable of forming water-insoluble calcium salts.

12. The composition according to claim 1, wherein the calcium carbonate is further contacted in step d) with a compound selected from the group consisting of a sodium silicate, a potassium silicate, a lithium silicate, an aluminium silicate, a synthetic silica, a calcium silicate, an aluminium hydroxide, a sodium aluminate, a potassium aluminate, and any mixture thereof.

13. The composition according to claim 1, wherein the surface-reacted calcium carbonate has a BET specific surface area of at least 40 $m^2/g$.

14. The composition according to claim 1, wherein the surface-reacted calcium carbonate has a BET specific surface area of at least 50 $m^2/g$.

15. The composition according to claim 1, wherein the surface-reacted calcium carbonate has a BET specific surface area of at least 60 $m^2/g$.

16. The composition according to claim 1, wherein the surface-reacted calcium carbonate has a BET specific surface area of at least 70 $m^2/g$.

17. The composition according to claim 1, wherein the surface-reacted calcium carbonate has a BET specific surface area of at least 80 $m^2/g$.

18. The composition according to claim 1, wherein step e) is performed and the aqueous suspension obtained in step d) is dried.

* * * * *